United States Patent
Asahi (10) Patent No.: US 7,056,256 B2
(45) Date of Patent: Jun. 6, 2006

(54) DIFFERENTIAL APPARATUS

(75) Inventor: Masahiko Asahi, Tochigi-ken (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/793,003

(22) Filed: Mar. 4, 2004

(65) Prior Publication Data

US 2004/0176208 A1 Sep. 9, 2004

(30) Foreign Application Priority Data

Mar. 7, 2003 (JP) ............ P. 2003-060813

(51) Int. Cl.
*F16H 48/06* (2006.01)
(52) U.S. Cl. .......... 475/249; 475/231; 475/232; 475/234; 475/236; 192/69.8
(58) Field of Classification Search .......... 475/231, 475/249, 250, 232, 234, 236; 192/69.8, 69.81, 192/69.82, 69.83
See application file for complete search history.

(56) References Cited

U.S. PATENT DOCUMENTS

| 5,176,590 A | * | 1/1993 | Haydock | 475/249 |
| 5,524,509 A | * | 6/1996 | Dissett | 74/650 |
| 5,749,803 A | * | 5/1998 | Teraoka et al. | 475/249 |
| 5,868,643 A | * | 2/1999 | Teraoka et al. | 475/252 |
| 6,076,429 A | * | 6/2000 | Valente | 74/650 |

FOREIGN PATENT DOCUMENTS

JP  6-344783  12/1994

* cited by examiner

*Primary Examiner*—Charles A. Marmor
*Assistant Examiner*—Justin K. Holmes
(74) *Attorney, Agent, or Firm*—Osha Liang LLP (57) ABSTRACT

A differential locking section is provided between a pair of output members that respectively mesh with a pair of gears. Since, at least one of the output members is composed of a first output shaft member that meshes with the gear, and a second output shaft member rotatable with and axially movable relative to the first output shaft member, differential locking can be effected by axially moving only the second output shaft member, while the mesh between the first output shaft member and one of gears is leaving.

10 Claims, 6 Drawing Sheets

DIFFERENTIAL APPARATUS

BACKGROUND OF THE INVENTION

The present invention relates to a differential apparatus including a clutch section for locking a differential motion between a pair of output members accommodated in a differential casing.

A differential apparatus of this type is disclosed in JP-A-06-344783, and will be briefly described as below. The differential apparatus includes helical pinion gears that are accommodated in receiving holes of a differential casing and mesh with each other, helical side gears, respectively, mesh-connected to the helical pinion gears, a locking member (shift sleeve) having a spur gear selectively meshing with a splined portion on an outer periphery of a right boss of the differential casing, and with a locking gear on a flange of the right side gear, and an operating member (shift fork) that operatively moves the locking member to lock a differential motion.

With the differential apparatus constructed in this manner, a drive force from an engine is transmitted to the differential casing and differentially delivered and transmitted from the helical pinion gears that mesh with each other, to the side gears, respectively, meshing with the helical pinion gears, and the drive force rotates right and left drive wheels via right and left drive shafts (not shown), respectively, connected to the respective side gears. And, in the case where a vehicle encounters a bad road such as a muddy road, etc. and an excessive differential motion is imminently generated by a wheel-spin of only one of the wheels, the operating member is operated to shift the shift sleeve to have the spur gear meshing with the locking gear on the side gear to connect and lock the differential casing and the side gear together, whereby the differential motion is stopped to dissolve the wheel-spin of only one of wheels, thus enabling escape from the bad road.

However, since such conventional differential apparatus adopts a construction, in which the shift sleeve serving as an operating member meshes on its side toward the differential casing with a whole periphery of the splined portion but the spur gear meshes at one point on a circumference with the locking gear on the side gear, a burden on the locking gear and the spur gear is increased. Also, the locking portion and the operating member are arranged at the same diameter and so a dimension in the axial direction is liable to be increased.

SUMMARY OF THE INVENTION

Therefore, it is an object of the invention to solve the problem involved in the above conventional differential apparatus and to provide a differential apparatus that ensures sure meshing to reduce a burden on locking gears, can also reduce the number of parts, and makes an operating section compact in axial direction and is simple in construction.

The object can be achieved by a differential apparatus according to the present invention comprising: a differential casing; a differential mechanism, accommodated in the differential casing, comprising a first and second output members and a differential member capable of accepting a differential motion between the output members, wherein the first output member comprises a first portion, and a second portion rotatable together with and axially movable relative to the first portion; a first and second drive shafts connected to and rotatable together with the first and second output members respectively; a clutch section, formed between the second output member and the second portion of the first output member, for connecting the second output member and the second portion of the first output member; and an actuator that moves the second portion of the first output member in an axial direction of the differential casing.

In the above mentioned differential apparatus according to the present invention, it is preferable that the second portion of the first output member comprises: an outer circumferential connecting portion that is engaged with the first portion of the first output member, and an inner circumferential connecting portion that is engaged with the first drive shaft.

Further in the above mentioned differential apparatus according to the present invention, it is preferable that he clutch section comprises: a first clutch formed on the first output member; and a second clutch formed on the second output member, and that the first and second clutches are faced each other in the axial direction.

Further in the above mentioned differential apparatus according to the present invention, it is preferable that the clutch section is disposed inside the differential casing, and the actuator is disposed outside the differential casing, so as to move the second portion axially.

Further it is more preferable that the above mentioned differential apparatus further comprises an intermediate member disposed between the actuator and the first portion, and that in the intermediate member and differential casing are rotatable together in a rotational direction, and relatively movable in the axial direction, and the intermediate member and the second portion are relatively rotatable in the rotational direction, and movable together in the axial direction.

Further in the above mentioned differential apparatus according to the present invention, it is preferable that the differential casing comprises a cylindrical inner wall section slidably supporting the second portion.

Further it is more preferable that the above mentioned differential apparatus further comprises a differential restriction section arranged in a path that transmits a differential motion between the first and second output members, for restricting the differential motion.

Further in the above mentioned differential apparatus according to the present invention, it is preferable that the differential members comprise a first and second helical pinions that mesh with the first and second output members respectively, and are capable of accepting a differential rotation between the output members, the helical pinions are rotatably supported relative to the differential casing, and the differential restriction section generates frictional resistance between the differential casing and each of the helical pinions.

Furthermore, in the above mentioned differential apparatus according to the present invention, it is more advantageous that the first helical pinion has a double-teeth pinion formed on both ends thereof with teeth, and the second helical pinion has a long-tooth pinion formed on its entire length with teeth, and that the first helical pinion meshes with the first output member, and the second helical pinion meshes with the second output member.

Further, it is preferable that the above mentioned differential apparatus further comprises a fork engaged with the actuator for directly pushing and moving the second portion in the axial direction.

Further, it is preferable that the above mentioned differential apparatus further comprises a fork that is engaged with the actuator for pushing and moving the first drive shaft in the axial direction and that the first drive shaft pushes and moves the second portion in the axial direction via an abutment formed in the second portion when the fork pushes and move the first drive shaft in the axial direction.

Further, it is preferable that the above mentioned differential apparatus further comprises a fork that is engaged with the actuator for pushing and moving the first drive shaft in the axial direction, and that the first drive shaft pushes and moves the second portion in the axial direction via a ring-shaped groove formed on the first drive shaft and a C-shaped clip ring fitted into the ring-shaped groove when the fork pushes and move the first drive shaft in the axial direction.

DESCRIPTION OF THE PREFERRED EMBODIMENT (First Embodiment)

A first embodiment of a differential apparatus according to the invention will be described below in detail with reference to FIGS. 1–4.

Figure 1:
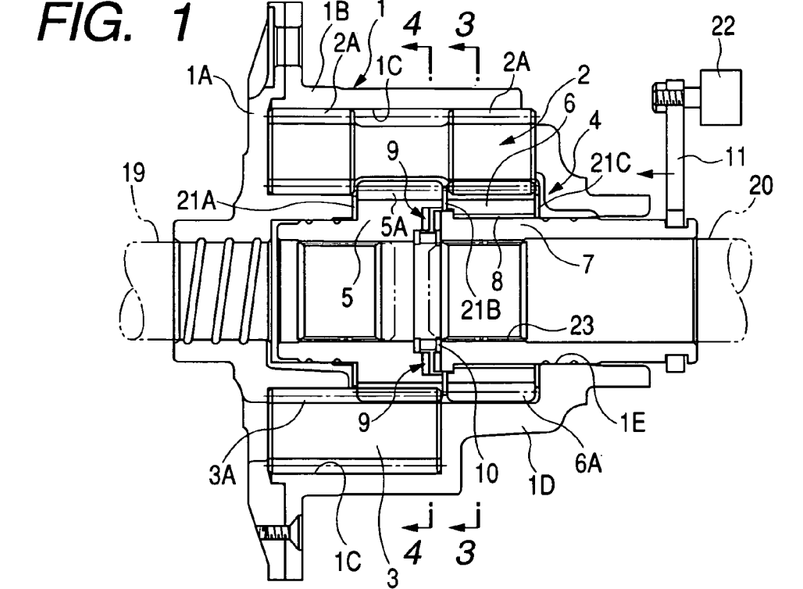
FIG. 1 is a general, cross sectional view showing a first embodiment of a differential apparatus, showing a state of a normal operation involving a differential motion.
Figure 2:
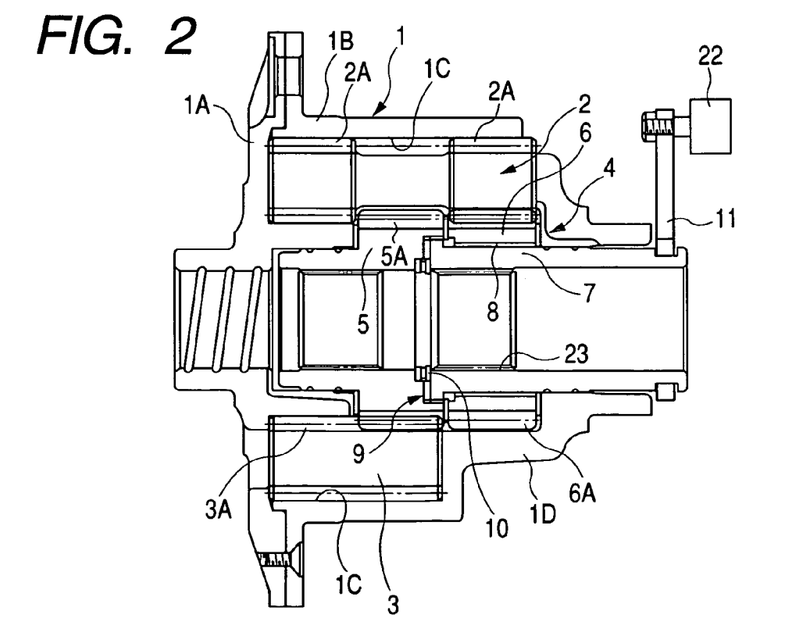
FIG. 2 is a general, cross sectional view showing the first embodiment of the differential apparatus, showing a state, in which a differential motion is locked.
Figure 3:
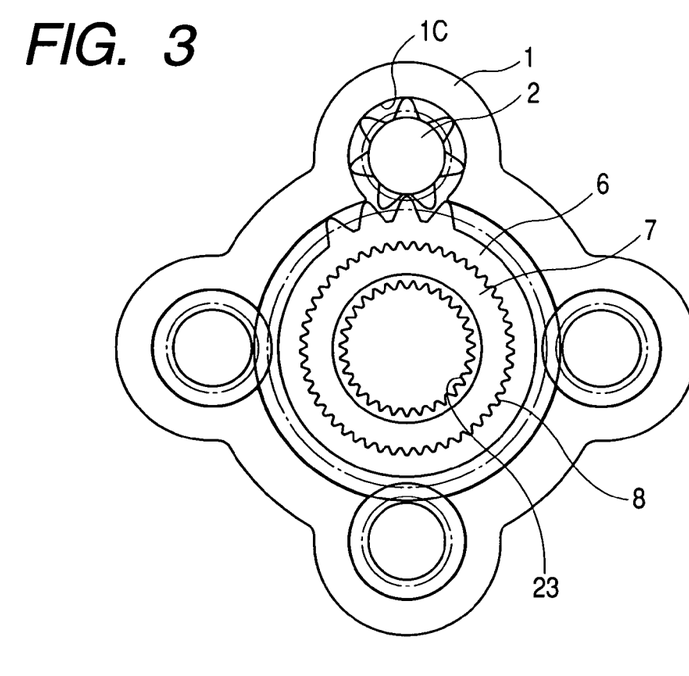
FIG. 3 is a cross sectional view taken along the line 3—3 in FIG. 1.
Figure 4:
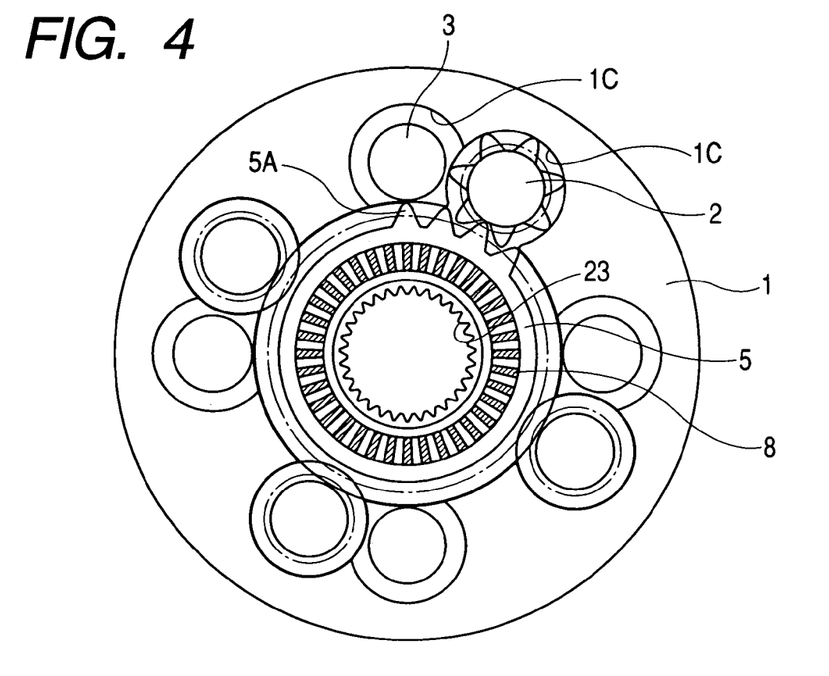
FIG. 4 is a cross sectional view taken along the line 4—4 in FIG. 1.

FIG. 1 is a general, cross sectional view showing a first embodiment of the differential apparatus according to the invention, showing a state of a normal operation involving a differential motion. FIG. 2 is a general, cross sectional view showing the first embodiment of the differential apparatus according to the invention, showing a state, in which a differential motion is locked. FIG. 3 is a cross sectional view taken along the line 3—3 in FIG. 1. FIG. 4 is a cross sectional view taken along the line 4—4 in FIG. 1.

The differential apparatus comprises a pair of gears 2, 3 as differential members, and a pair of output members 4, 5. Outer circumferential surfaces of the pair of gears 2, 3 are accommodated and supported in a receiving section 1C of a differential casing 1, the pair of gears 2, 3 are meshing mutually. The pair of output members 4, 5 are meshing with the pair of gears 2, 3 respectively. A pair of drive shafts 19, 20 are connected to and rotated together with the pair of output members 4, 5 respectively. The differential apparatus further comprises a differential locking section 9 provided between the pair of output members 4, 5, and wherein at least one (for example, a first output member 4) of the pair of output members 4, 5 comprises a first portion 6 (a output shaft member 6) meshing with one of the pair of gears (2), and a second portion 7 (a second output shaft member 7) rotatable with and axially movable relative to the first output shaft member 6.

The embodiment is applied to a helical differential apparatus that comprises helical pinions 2, 3 and side gears 4, 5. The helical pinions 2, 3 are constituting a pair of first and second gears having axes of rotation in parallel to an axis of rotation of a differential casing 1. The differential casing 1 is constructed by clamping split first and second differential casings 1A, 1B. The side gears 4, 5 are constituting a pair of first and second output members, respectively, meshing with the respective pinions 2, 3 and having axes of rotation coaxial with the axis of rotation of the differential casing 1.

In this construction, by the mesh reaction forces of the helical gears 2, 3, 4, 5, a thrust force in an axial direction and a radial force in a radial direction are generated between tooth-tops of the pinions 2, 3 and inner surfaces and a peripheral surface of a receiving section 1C in the differential casing 1 that accommodates therein the pinions 2, 3. By the thrust force and the radial force, a sliding frictional resistance is generated, thereby, the differential motion is restricted. In this manner, the pinions 2, 3 and inner surfaces and a peripheral surface of a receiving section 1C in the differential casing 1 constitute a differential restriction section, and can also act as alternative transmission paths of the burden when differential motion is locked.

One of the pinions 2, 3 comprises a double-teeth pinion 2 formed on both ends thereof with teeth 2A that has a long axis, and the other pinions 2, 3 comprises a long-tooth pinion 3 formed on its entire length with teeth 3A that has a short axis. The pinions 2, 3 are helical-meshing with each other. And, the second side gear 5, having its teeth 5A positioned between the teeth 2A of the double-teeth pinion 2, helical-meshes only with the long-tooth pinion 3. The first side gear 4 helical-meshes only with one of the teeth 2A of the double-teeth pinion 2. Thus, the rotating drive force from the differential casing 1 is differentially delivered and transmitted to the mutually meshing pinions 2, 3 and the side gears 4, 5 that mesh respectively with the pinions 2, 3, and rotates right and left drive shafts 19, 20 fitted into and connected to inner peripheries of the side gears 4, 5, and thereby the differential apparatus performs the differential motion.

A differential locking section (differential locking) 9, as a clutch section, that locks the differential motion is arranged on a facing portion between the first output member 4 and the second output member 5 that constitute the side gears. And, at least one of the output members 4, 5, for example the first side gear 4 (first output member 4) as shown in the drawings, is composed of the first output shaft member 6 (first portion 6) that meshes with the double-teeth pinion 2, and the second output shaft member 7 (second portion 7) rotatable with and axially movable relative to the first output shaft member 6 (for example, a spline fitting portion 8 (outer circumferential connecting portion 8) formed on a outer circumference of the second output shaft member 7 is fitted into the first output shaft member 6 by spline fitting). The second output shaft member 7 (second portion 7) is further connected to the right drive shaft 20 by spline fitting via a spline fitting portion 23 (inner circumferential connecting portion 23) formed between the second output shaft member 7 (second portion 7) and the right drive shaft 20. With such construction, for the purpose of the locking motion, only the second output shaft member 7 (second portion 7) can be axially moved, especially without changing a position, in an axial direction, of the meshing portions between the first output shaft member 6 (first portion 6) and the pinion 2 that adopt helical gears.

The first and second side gears 4, 5 (first and second output members 4, 5) are supported to the axial direction in the differential casing 1 via washer-spacers 21A, 21B, 21C, in FIG. 1, however the first and second side gears can be directly disposed in the differential casing without any washer-spacers.

The differential locking section 9 (clutch section 9) is formed between the second side gear 5 (second output member 5) and the first side gear 4 (first output member 4). The differential locking section 9 (clutch section 9) comprises plural dog teeth 9 formed on the first and second side gears, wherein the plural dog teeth formed on the first side gear 4 constitutes a first clutch, and the plural dog theeth formed on the second side gear 5 constitutes a second clutch. The first and second clutches are faced each other in the axial direction. A return spring 10 is interposed between the facing surfaces of the second side gear 5 (second output member 5) and the inner output shaft member 7 (second portion 7), inside the dog teeth 9. The return spring 10 biases the respective side gears outward in the axial direction, and can generate an inertial torque. A portion in the second output shaft member 7 (second portion 7), that is exposed outside the right wall section 1D of the differential casing 1, is connected to an operating member such as a fork 11 or the like that is appropriately operated by a powered actuator 22. The fork 11 is operated to advance the second output shaft member 7 (second portion 7) in the axial direction against the bias of the return spring 10, thereby the dog teeth 9 are coupled, and the differential motion is locked. Since, the inner output shaft member 7 (second portion 7) is slidably supported in a cylindrical inner wall section 1E formed in the right wall section 1D of the differential casing 1, the axial movement of the inner output shaft member 7 is stably operated.

Thus, by taking advantage of helical gears capable of obtaining a large differential locking force as compared with spur gears, etc., only split second output shaft member 7 (second portion 7) can be axially moved to perform differential locking, while leaving the helical meshing section between the pinion 2 and the side gear 4 (or the first output shaft member 6) that are inconvenient in axial movements. Further, a burden can be reduced since a locking load is borne by the plural dog teeth 9, a load at the time of differential locking can be shared and borne by not only the differential locking section 9 but also the meshing portions of other gears that act as alternative transmission paths of the burden, and so the burden on the dog teeth 9 of the differential locking section 9 is further reduced, because the frictional resistance between the pinions 2, 3 and receiving section 1C of the differential casing 1 can also restrict the differential motion.

Further, the differential locking section 9 and the operating section composed of the actuator 22 are not necessarily arranged in the same-diameter region, so that a dimension in the axial direction can be made compact and freedom in design is increased.

Further, if the differential locking section such as the dog teeth or the like is not mounted by means of welding or the like, degradation in mesh accuracy that accompanies heat treatment, or the like is not incurred. In addition, according to this embodiment, it is possible to omit parts such as an operating ring (the shift sleeve in JP-A-06-344783), etc.

(Second Embodiment)

Figure 5:
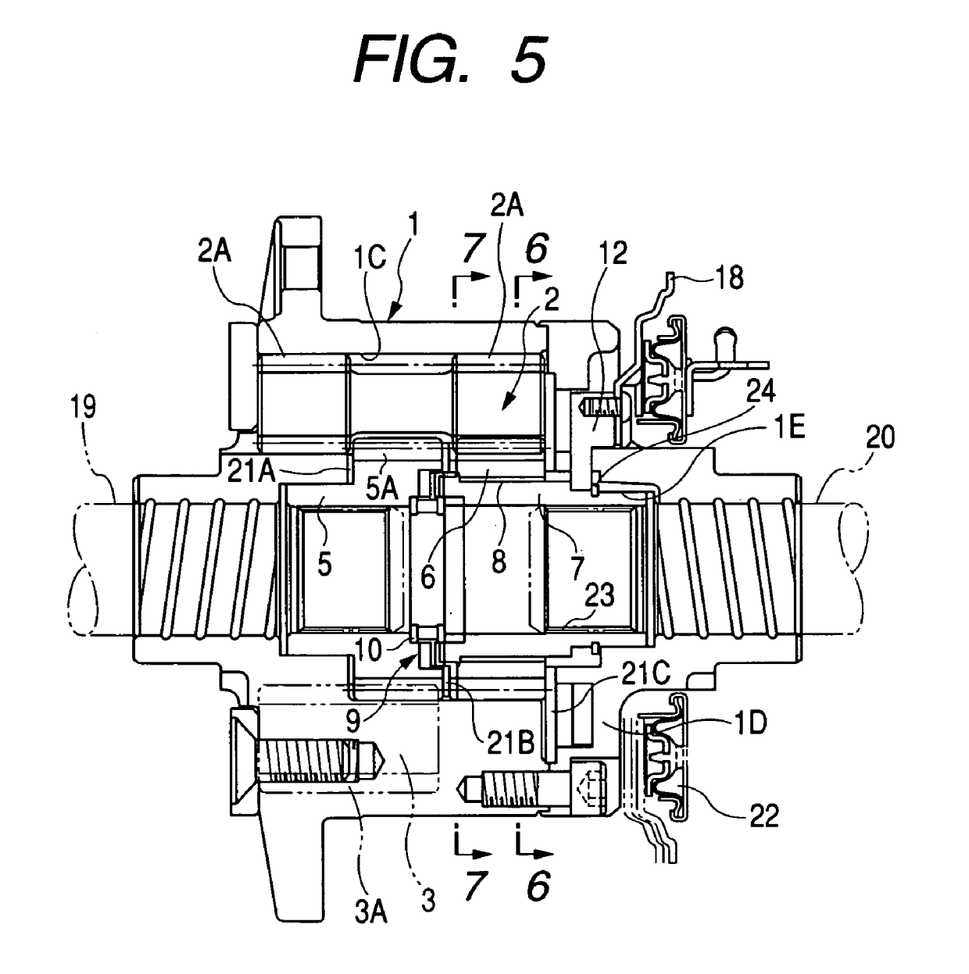
FIG. 5 is a general, cross sectional view, as sectioned by a plane that contains mount bolts, showing a second embodiment of a differential apparatus, showing a state of a normal operation involving a differential motion.
Figure 6:
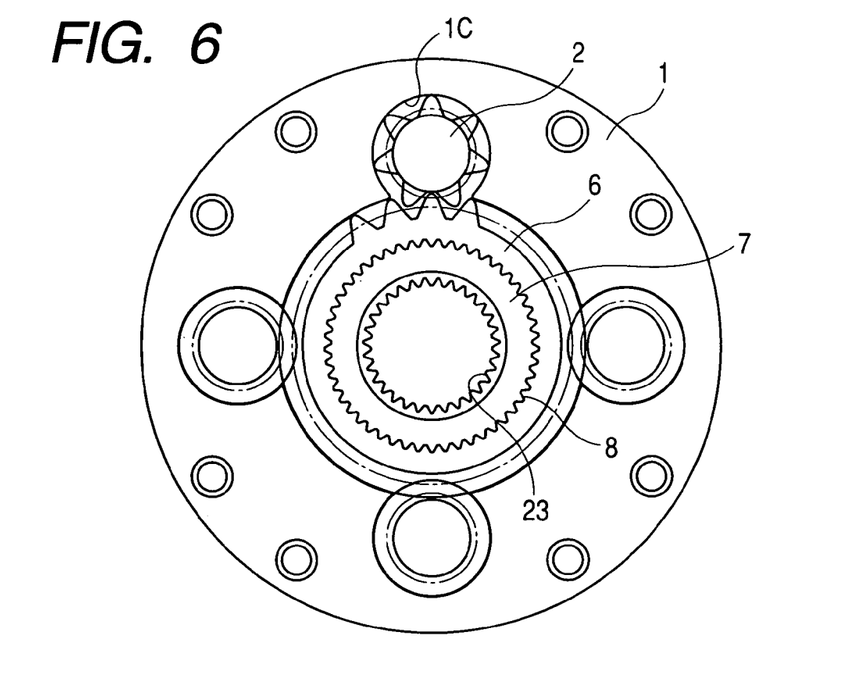
FIG. 6 is a cross sectional view taken along the line 6—6 in FIG. 5.
Figure 7:
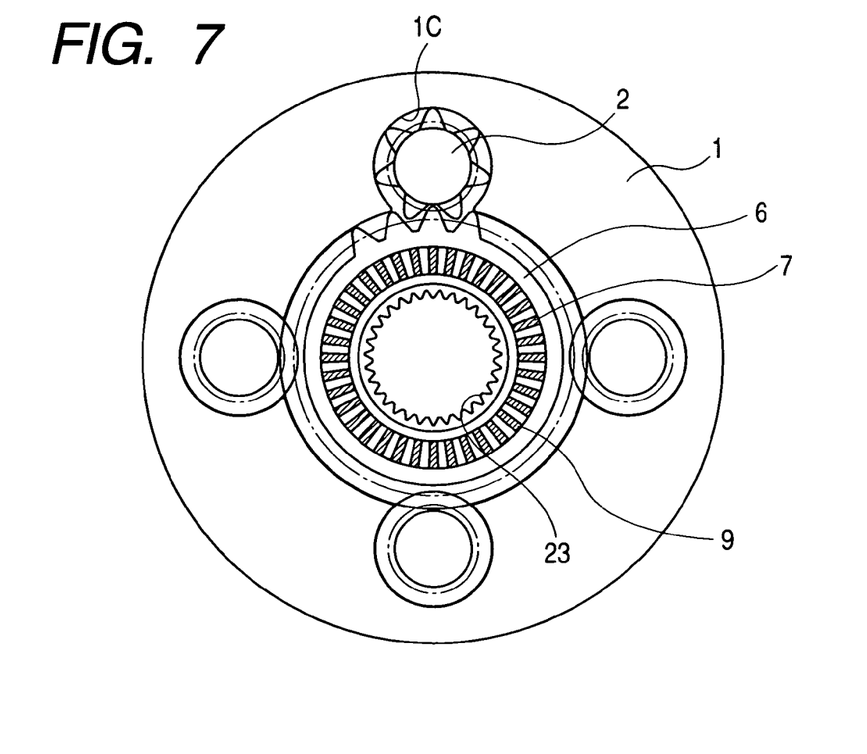
FIG. 7 is a cross sectional view taken along the line 7—7 in FIG. 5.

FIGS. 5 to 7 show a second embodiment of the differential apparatus according to the invention. FIG. 5 is a general, cross sectional view, as sectioned by a plane that contains mount bolts, showing a state of a normal operation involving a differential motion, and showing a long-teeth helical pinion 3 by dashed lines. FIG. 6 is a cross sectional view taken along the line 6—6 in FIG. 5, in which only a double-teeth helical pinion 2 constituting a first gear is seen. FIG. 7 is a cross sectional view taken along the line 7—7 in FIG. 5, in which only the double-teeth helical pinion 2 and dog teeth 9 serving as a differential locking section are seen.

While according to the first embodiment the portion of the second output shaft member 7 exposed outside the differential casing is operated by the operating member. However, according to the second embodiment, an operating ring 12 (an intermediate member 12) as an operating member is arranged between an inner side surface of the differential casing 1 and the pinion 2, to be axially movable, and brought into sliding contact with a diaphragm type fluid actuator 22 to be pushed and operated thereby.

The operating ring 12 (intermediate member 12) is fitted entirely circumferentially into a groove on an outer peripheral surface of the second output shaft member 7 (second portion 7) that serves as a differential locking operating member, and restricted in axial movement relative to the second output shaft member 7 (second portion 7) by a snap ring 24. Axial extensions are formed at several locations on a circumference of the operating ring 12 to penetrate corresponding holes formed on a right wall 1D of the differential casing 1, and a sliding contact plate 18 is fixed to the extensions and pushed by the actuator 22 arranged on a stationary part. Accordingly, the operation ring 12 is connected to the differential casing 1, to be rotationally unmovable, and to be axially movable, relative to the differential casing 1. With such construction, the operating ring 12 and the actuator 22 are concentrated and arranged on the right side of the differential casing 1 but are not arranged in the same-diameter region as that of the differential locking section 9, so that they can be designed independently of the differential locking section whereby a dimension in the axial direction is made compact and an operating load from the operating ring 12 can be borne entirely circumferentially by the groove on the outer peripheral surface of the second output shaft member 7 with the result that stress is small and the operation can be smoothly performed.

(Third Embodiment)

Figure 8:
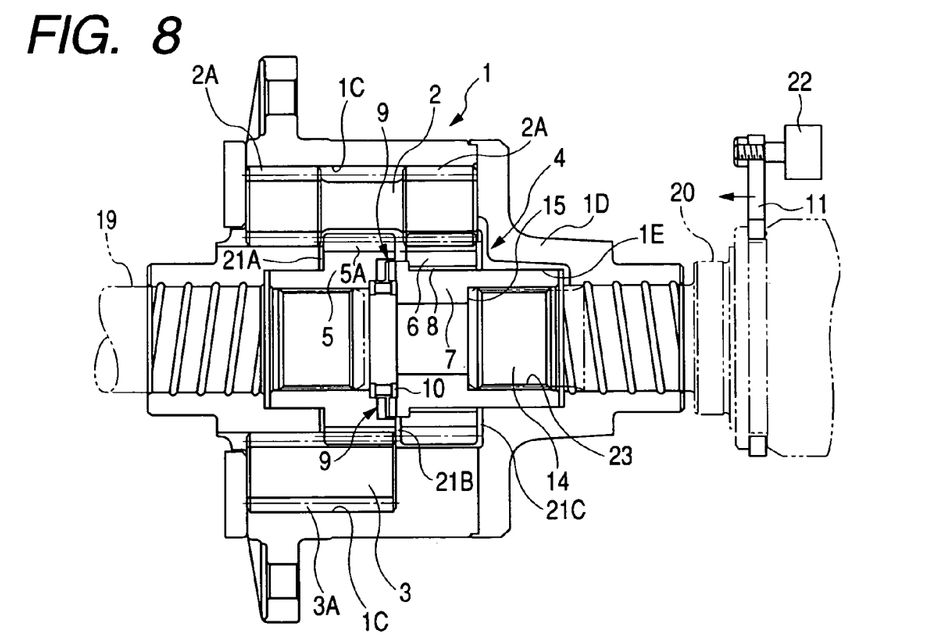
FIG. 8 is a general, cross sectional view showing a third embodiment of the differential apparatus, showing a state of a normal operation involving a differential motion.
Figure 9:
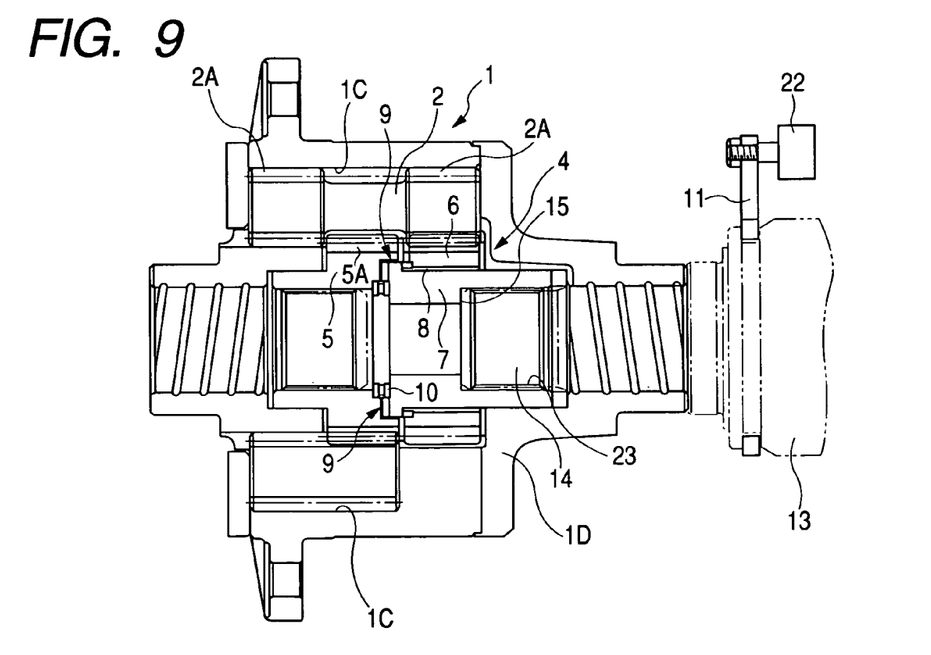
FIG. 9 is a general, cross sectional view showing a third embodiment of the differential apparatus, showing a state, in which a differential motion is locked.

FIG. 8 and FIG. 9 are general, cross sectional views showing a third embodiment of the differential apparatus according to the invention. FIG. 8 shows a state of a normal operation involving a differential motion. FIG. 9 shows a state, in which a differential motion is locked.

The present embodiment is fundamentally constituted on the basis of the first embodiment shown in FIG. 1. However, in the present embodiment, in order to move a second output member 7 as a differential locking member axially, a drive shaft 14 that abuts against and is fitted into the second output member 7 directly pushes the second output shaft member 7. More specifically, since the drive shaft 14 provided with a constant velocity joint 13 is movable in an axial direction, an operating member 11 operated by an actuator 22 pushes and moves the drive shaft 14 axially as shown in FIG. 9, whereby an inner end of the drive shaft 14 axially moves the second output shaft member 7 via an abutment 15 that forms a step, and thus performs locking of the differential locking section 9. Thereby, the operating member is made simple in structure and the number of parts is sharply reduced.

(Fourth Embodiment)

Figure 10:
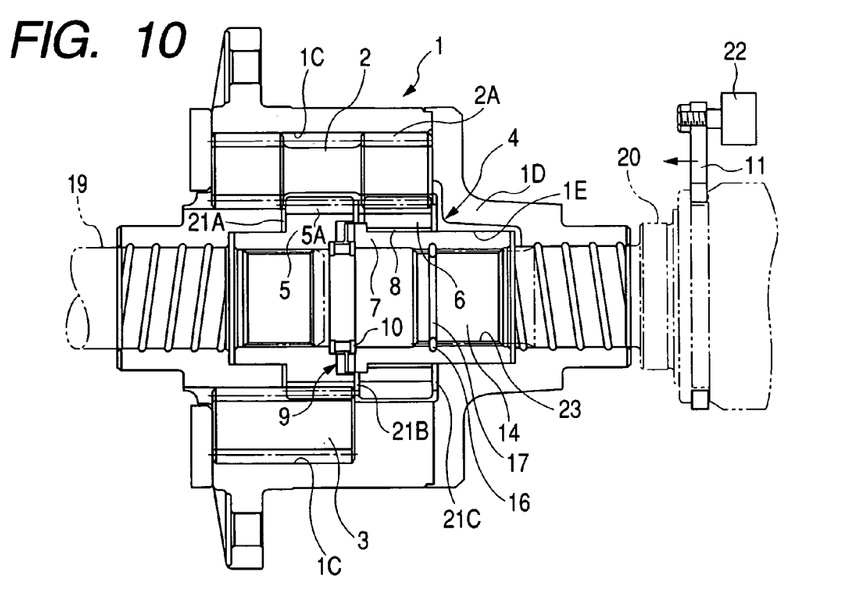
FIG. 10 is a general, cross sectional view showing a fourth embodiment of the differential apparatus, showing a state of a normal operation involving a differential motion.
Figure 11:
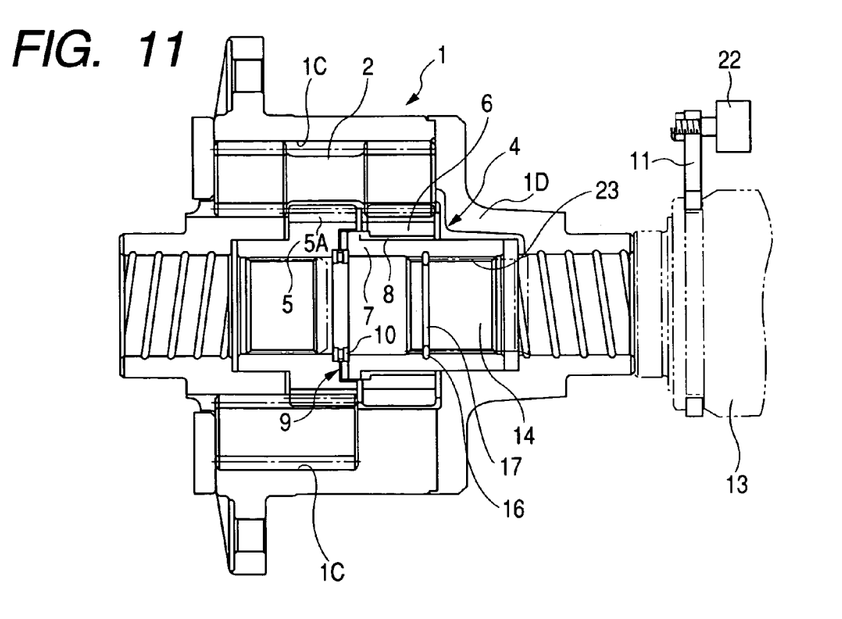
FIG. 11 is a general, cross sectional view showing a fourth embodiment of the differential apparatus, showing a state, in which a differential motion is locked.

FIG. 10 and FIG. 11 are general, cross sectional views showing a fourth embodiment of the differential apparatus according to the invention. FIG. 10 shows a state of a normal operation involving a differential motion. FIG. 11 shows a state, in which a differential motion is locked.

The present embodiment is also fundamentally constituted on the basis of the first embodiment shown in FIG. 1, and is the same as the third embodiment shown in FIG. 8 and FIG. 9 in that a drive shaft 14 fitted into a second output shaft member 7 serving as a differential locking member directly pushes the second output shaft member 7 to cause axial movement thereof. However, according to the present embodiment, a C-shaped clip ring 16 fitted into a ring-shaped groove 17 connects the second output shaft member 7 and the drive shaft 14 together. As shown in FIG. 11, an operating member 11 pushes and moves the drive shaft 14 axially whereby the second output shaft member 7 is axially moved via the C-shaped clip ring 16 latched on the drive shaft 14, and locking of the differential locking section 9 is achieved. Thereby, it suffices that only the C-shaped clip ring 16 be mounted while adopting an ordinary fitting configuration provided by spline fitting of the drive shaft 14 into the second output shaft member 7, and so forming of respective parts is further simplified without incurring a decrease in strength of the second output shaft member 7.

While the embodiments of the invention have been described above, it is possible within the scope of the invention to appropriately select a location, in which a differential apparatus is arranged (applicable to all of a front-wheel-side differential apparatus, a rear-wheel-side differential apparatus, and a center differential), a shape of a differential casing including a receiving section of pinions (a split configuration comprising a plurality of axially split sections, or the like), shapes of a pair of gears and side gears being output members (as far as the differential function is provided, the related constitution of a double-teeth pinion, a long-teeth pinion, and side gears is not limited to that of the embodiments as shown), a type (as for the mesh mode, not only helical meshing in the embodiments but also a parallel-shaft mesh type by meshing of spur gears, a skew mesh type by such as worms, a type outputting from pinions supported in a differential casing to a pair of output members comprising internal gear and sun gear, a type outputting from ring gear formed in a differential casing via pinions to a pair of output members comprising a pinion carrier and a sun gear, and a bevel gear type, etc., are adoptable), and the like.

Also, it is possible to appropriately select shape and type of a differential locking section (a type of dog teeth between parallel facing end surfaces, a gear type of spline fitting between coaxial inner and outer peripheries, and the like) including shape, type (coil, belleville spring, a combination thereof, etc.) and a configuration of arrangement of a return spring, the related constitution of a first output shaft member and a second output shaft member that constitute output members (As a fitting configuration of these members, not only a configuration, in which fitting portions such as spline grooves, etc. are formed entirely circumferentially, but also a configuration, in which lug grooves, etc. are formed on a circumference at intervals, suffices, and a configuration in which a ball-spline mechanism is arranged on the fitting portion, may be selected. Further, in addition to the embodiments in which inner and outer fitting configurations are adopted, for example, an appropriate insertion configuration in which a second output shaft member is longitudinally movable relative to a first output shaft member irrespective of an axial direction, is also adoptable), and shape, type (appropriate ones such pneumatic, hydraulic, electric such as electromagnet, etc., or mechanical, etc.) and location of arrangement of an actuator.

In addition, the differential restriction section arranged in the path connecting the first and second output members can be disposed on one of a portion between the first and second output members, a portion between the differential casing and one of the output members, and a portion between the differential casing and differential members.

As described above in detail, the invention provides a differential apparatus comprising a differential casing; a differential mechanism, accommodated in the differential casing, comprising a pair of output members and a differential member that differentially connects the pair of output members mutually, one of the pair of output member comprising: a first portion, and a second portion rotatable together with and axially movable relative to the first portion; a pair of output shafts connected to and rotatable together with the respective output members; a clutch section, mounted between the other of the pair of output members and the second portion, that connects the other of the pair of output members and the second portion; and an actuator that moves the second portion in the axial direction.

Therefore, a burden can be reduced since a locking load is borne by the plural dog teeth, a load at the time of differential locking can be shared and borne by not only the differential locking section but also the meshing portions of other gears that act as alternative transmission paths of the burden, and so the burden on the dog teeth of the differential locking section is further reduced, because the frictional resistance between the pinions, and receiving section 1C of the differential casing also can restrict the differential motion.

Further, the differential locking section and the operating section composed of the actuator are not necessarily arranged in the same-diameter region, so that a dimension in the axial direction can be made compact and freedom in design is increased.

Also, since the second portion is fitted coaxially into the first portion, a combination of simple structures enables axial movements of only the second portion without being concerned in the meshing portion of the first portion.

What is claimed is:

1. A differential apparatus comprising:

a differential casing;

a differential mechanism, accommodated in the differential casing, comprising a first and second output members and a differential member capable of accepting a differential motion between the output members, wherein said first output member comprises a first portion, and a second portion rotatable together with and axially movable relative to the first portion;

a first and second drive shafts connected to and rotatable together with the first and second output members respectively;

a clutch section, formed between the second output member and the second portion of the first output member, for connecting the second output member and the second portion of the first output member; and an actuator that moves the second portion of the first output member in an axial direction of the differential casing, wherein the second portion of the first output member comprises:

an outer circumferential connecting portion that is engaged with the first portion of the first output member; and an inner circumferential connecting portion that is engaged with the first drive shaft.

2. The differential apparatus according to claim 1, wherein the clutch section comprises:

a first clutch formed on the first output member; and a second clutch formed on the second output member, wherein said first and second clutches face each other in the axial direction.

3. A differential apparatus comprising:

a differential casing;

a differential mechanism, accommodated in the differential casing, comprising a first and second output members and a differential member capable of accepting a differential motion between the output members, wherein said first output member comprises a first portion, and a second portion rotatable together with and axially movable relative to the first portion;

a first and second drive shafts connected to and rotatable together with the first and second output members respectively;

a clutch section, formed between the second output member and the second portion of the first output member, for connecting the second output member and the second portion of the first output member; and an actuator that moves the second portion of the first output member in an axial direction of the differential casing, wherein the clutch section is disposed inside the differential casing, and the actuator is disposed outside the differential casing so as to move the second portion axially.

4. The differential apparatus according to claim 3, further comprising an intermediate member disposed between the actuator and the first portion, and wherein the intermediate member and differential casing are rotatable together in a rotational direction, and relatively movable in the axial direction, and the intermediate member and the second portion are relatively rotatable in the rotational direction, and movable together in the axial direction.

5. A differential apparatus comprising:

a differential casing;

a differential mechanism, accommodated in the differential casing, comprising a first and second output members and a differential member capable of accepting a differential motion between the output members, wherein said first output member comprises a first portion, and a second portion rotatable together with and axially movable relative to the first portion;

a first and second drive shafts connected to and rotatable together with the first and second output members respectively;

a clutch section, formed between the second output member and the second portion of the first output member, for connecting the second output member and the second portion of the first output member; and an actuator that moves the second portion of the first output member in an axial direction of the differential casing;

wherein the differential casing comprises:

a cylindrical inner wall section slidably supporting said second portion.

6. A differential apparatus comprising:

a differential casing;

a differential mechanism, accommodated in the differential casing, comprising a first and second output members and a differential member capable of accepting a differential motion between the output members, wherein said first output member comprises a first portion, and a second portion rotatable together with and axially movable relative to the first portion;

a first and second drive shafts connected to and rotatable together with the first and second output members respectively;

a clutch section, formed between the second output member and the second portion of the first output member, for connecting the second output member and the second portion of the first output member;

an actuator that moves the second portion of the first output member in an axial direction of the differential casing;

a differential restriction section arranged in a path that transmits a differential motion between the first and second output members, for restricting the differential motion, wherein the differential members comprise a first and second helical pinions that mesh with the first and second output members respectively, and are capable of accepting the differential motion between the output members;

the helical pinions are rotatably supported to the differential casing; and the differential restriction section generates frictional resistance between the differential casing and each of the helical pinions.

7. The differential apparatus according to claim 6, wherein said first helical pinion has a double-teeth pinion formed on both ends thereof with teeth, and said second helical pinion has a long-tooth pinion formed on its entire length with teeth, and wherein the first helical pinion meshes with the first output member, and the second helical pinion meshes with the second output member.

8. The differential apparatus according to claim 3, further comprising:

a fork engaged with the actuator for directly pushing and moving the second portion in the axial direction.

9. The differential apparatus according to claim 3, further comprising:

a fork that is engaged with the actuator for pushing and moving the first drive shaft in the axial direction, wherein, when the fork pushes and move the first drive shaft in the axial direction, the first drive shaft pushes and moves the second portion in the axial direction via an abutment formed in the second portion.

10. The differential apparatus according to claim 3, further comprising:

a fork that is engaged with the actuator for pushing and moving the first drive shaft in the axial direction, wherein, when the fork pushes and move the first drive shaft in the axial direction, the first drive shaft pushes and moves the second portion in the axial direction via a ring-shaped groove formed on the first drive shaft and a C-shaped clip ring fitted into the ring-shaped groove.

* * * * *